J. A. JEFFERY.
AUTOMOBILE LIFTING JACK.
APPLICATION FILED APR. 13, 1916.

1,198,922.

Patented Sept. 19, 1916.

Inventor
John A. Jeffery

Witnesses

By Franklin H. Hough

Attorney

UNITED STATES PATENT OFFICE.

JOHN A. JEFFERY, OF CANTON, NEW YORK, ASSIGNOR OF ONE-HALF TO R. E. CLEAVELAND, OF CANTON, NEW YORK.

AUTOMOBILE-LIFTING JACK.

1,198,922.     Specification of Letters Patent.     Patented Sept. 19, 1916.

Application filed April 13, 1916. Serial No. 90,982.

*To all whom it may concern:*

Be it known that I, JOHN A. JEFFERY, a citizen of the United States, residing at Canton, in the county of St. Lawrence and State of New York, have invented certain new and useful Improvements in Automobile-Lifting Jacks; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in lifting jacks and is particularly adapted for use in raising automobiles and it has for its object to provide an automobile jack which will be simple of construction, cheap to manufacture and which may be readily placed under an automobile to raise either end off the ground, or two of said jacks may be employed to raise all four wheels of an automobile off the floor when it is desired.

The invention comprises various details of construction, combinations and arrangements of parts which will be hereinafter fully described, shown in the accompanying drawings and then specifically defined in the appended claim.

Figure 1:
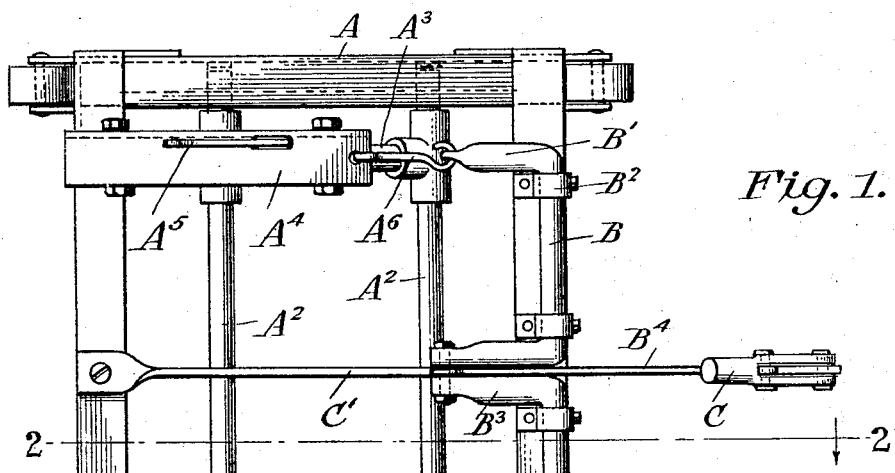
Figure 2:
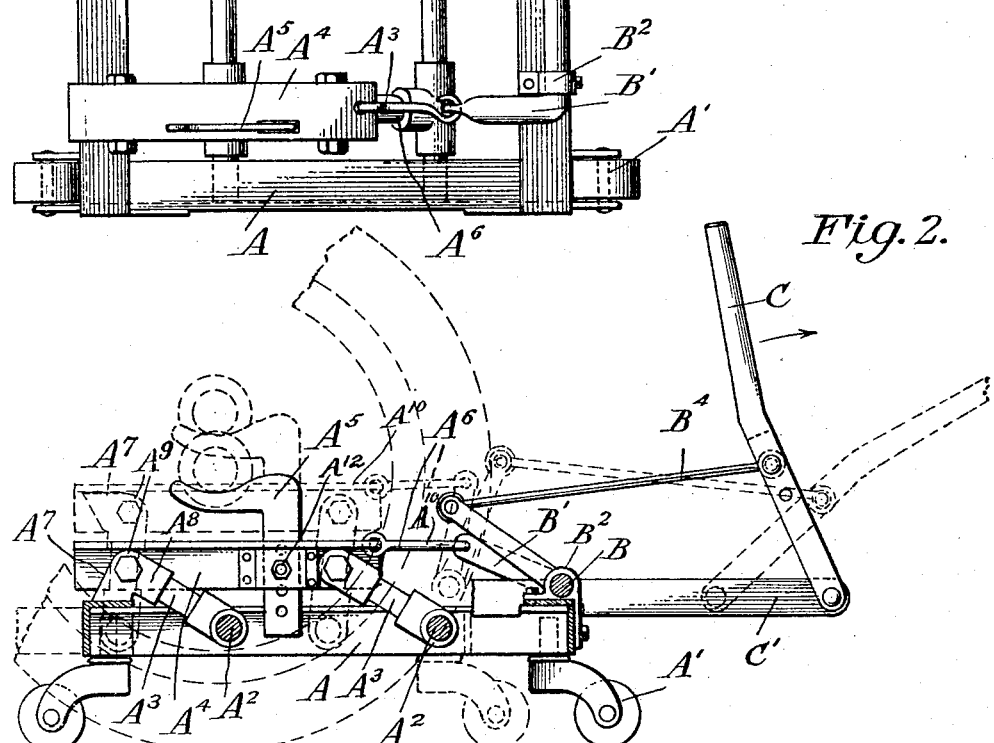

I illustrate my invention in the accompanying drawings, in which:

Figure 1 is a top plan view of a jack constructed in accordance with my invention and Fig. 2 is a side elevation of the same, the lifting head being shown elevated by dotted lines.

Reference now being had to the details of the drawings by letter, A designates the frame which is mounted on wheels $A^1$, and $A^2$ represents two shafts suitably mounted in the frame A and each is provided with two rocking arms $A^3$ which are pivotally connected at their upper ends by bars $A^4$ to which are adjustably secured the lifting heads $A^5$ which are adapted to be placed under the front or rear axle of an automobile which is to be raised, said heads $A^5$ being held in different adjusted positions by means of a bolt $A^{12}$ passed through registering apertures in the bar $A^4$ and apertures in the shank portion of the lifting head $A^5$.

The arms upon one shaft are provided each with an angled member $A^8$ having a rounded corner $A^9$ and a straight portion $A^7$, which rounded portion is adapted to permit the angle member to turn freely without interference from the flange $A^{10}$ of the frame A when the latter is elevated to the position shown in dotted lines in Fig. 2, the straight portion $A^7$ bearing flat against the flange of the member $A^4$ when in such elevated position.

The rear ends of the bars $A^4$ are connected by links $A^6$ to the outer arms $B^1$ of the crank shaft B, mounted in bearings $B^2$ on the frame A. Said shaft B has upwardly extending crank arms $B^3$ at its center which are connected by a link rod $B^4$ to an operating lever C which is pivoted at its lower end to a rearwardly extending bar $C^1$ which is secured to the frame.

It will be seen upon reference to Figs. 1 and 2 of the drawings that, when the jack is properly placed under an automobile with the axle resting on the lifting heads $A^5$, the lever C may be pulled down and the lifting heads will rise vertically to the position shown in dotted lines, while the frame A slides under the automobile until the arms $A^3$ have passed over the vertical center and are stopped by the flat portions $A^7$ of the angled members $A^8$ coming in contact with the under surface of the lateral projection $A^{10}$ of the frame.

What I claim to be new is:—

A lifting jack comprising a truck and shafts mounted thereon, rocking arms mounted in pairs upon said shafts, a flanged lifting frame to which said arms are connected, angled members mounted one upon each of the arms of one shaft and each angled member having a rounded corner and a flat portion adjacent thereto, designed to bear against the under surface of the flanges of said lifting frame, a rock shaft with crank arms mounted thereon, one of the latter pivoted to said lifting frame, a bar secured to the truck frame and a lever pivoted to said bar and having link connections with the other of the crank arms upon the rock shaft, and an adjustable lifting head upon the frame.

In testimony whereof I hereunto affix my signature in presence of two witnesses.

JOHN A. JEFFERY.

Witnesses:
FRANK N. CLEAVELAND,
GENEVIEVE BANTER.

Copies of this patent may be obtained for five cents each, by addressing the "Commissioner of Patents, Washington, D. C."